Dec. 11, 1973          C. B. HAMBY, JR                3,778,486
                   TURPENTINE FRACTION PURIFICATION
Filed April 19, 1972                              2 Sheets-Sheet 1

United States Patent Office 3,778,486
Patented Dec. 11, 1973

3,778,486
TURPENTINE FRACTION PURIFICATION
Clayton B. Hamby, Jr., Orange Park, Fla., assignor to
SCM Corporation, Cleveland, Ohio
Filed Apr. 19, 1972, Ser. No. 245,555
Int. Cl. C07c 13/00, 27/02
U.S. Cl. 260—675.5                                4 Claims

ABSTRACT OF THE DISCLOSURE

Set forth is a process for treating a turpentine hydrocarbon fraction having not substantially more than about 500 parts per million sulfur content with activated carbon for the purpose of removing such sulfur to an essentially negligible quantity. It comprises the steps of feeding a sulfur-laden turpentine fraction to a primary stage containing activated carbon and removing essentially all of the sulfur material in said fraction stage and then regenerating the resulting sulfur-laden carbon in a plurality of steps; the first being done at a temperature sufficient for removing a substantial proportion of adsorbed hydrocarbon compounds without removing substantial sulfur compounds from said carbon and the second being at a temperature sufficient for removing said sulfur compounds without effecting substantial damage to said carbon.

---

One of the important turpentine hydrocarbon fractions present in turpentine is $\beta$-pinene, as opposed to $\alpha$-pinene is particularly advantageous because of its chemical structure for making resinous materials or as an intermediate in the synthesis of flavor and perfumery chemicals. However, in U.S. turpentine fractions, $\beta$-pinene usually is present in only small proportions whereas there are much larger proportions of $\alpha$-pinene. A few years ago, two U.S. patents issued to Dr. John Derfer of the Glidden Company relating to the isomerization of $\alpha$-pinene to $\beta$-pinene. They are 3,278,623 and 3,358,342. The process discovered by him was very economical and provided for a feasible route for isomerizing $\alpha$-pinene to $\beta$-pinene. In that process $\alpha$-pinene is contacted with a catalyst, typically palladium, for effecting the isomerization. Unfortunately, sulfur compounds which are usually present in turpentine derived from crude sulfate turpentine, act as a poison to this catalyst. Therefore, removal of the sulfur compounds preferably to extremely low value in a feedstock with $\alpha$-pinene is desirable so that catalyst poisoning will not be as significant in the isomerization process.

In the past an $\alpha$-pinene feed stock relatively low in sulfur content has been prepared by dispersing small amounts of elemental sodium in a turpentine hydrocarbon fraction laden with sulfur bodies or by dispersing a hypochlorite solution such as sodium hypochlorite in the feed stock or both methods for conversion of the sulfur compounds to water-soluble salts. These salts then could be removed by washing the hydrocarbon fraction with water and decanting. Subsequently, the oil layer was distilled recovering a feed stock relatively low in sulfur.

A secondary process for producing a feed stock has been to selectively distill the turpentine hydrocarbon fraction recovering an $\alpha$-pinene moderately low in sulfur content. Distillation was difficult and the product obtained normally had a high proportion of sulfur bodies; e.g., 100 parts per million sulfur.

The prior art processes, even though capable of producing a feed stock high in $\alpha$-pinene, were undesirable in that the sulfur content was too high. As a result, the catalyst life for isomerization was extremely short, thus increasing the costs of producing $\beta$-pinene. Secondly, the processes have undesirable features, particularly the process wherein elemental sodium was used, as handling elemental sodium was extremely difficult. The process employing a hypochlorite solution has an undesirable feature in that simultaneous with the destruction of sulfur bodies was the chlorination of unsaturated sites in the turpentine hydrocarbon fraction. Before the feed stock could be utilized for isomerization, it had to be distilled removing the chlorinated hydrocarbons. As a result of such chlorination and distillation, there was a loss of product due to the chlorination and increased costs due to the additional processing steps.

A process has been found which is highly efficient and has very desirable features for removing sulfur and sulfur-related compounds from a turpentine hydrocarbon fraction high in $\alpha$-pinene. It comprises contacting the hydrocarbon fraction with activated carbon in a primary stage for a time sufficient to remove substantially all the sulfur compounds present and then regenerating the carbon when spent. The regeneration of the carbon comprises a two-step regenerative process. In the first stage an inert gas is passed into contact with carbon at a temperature not to exceed about 150° C. for a time sufficient to remove substantially all of adsorbed hydrocarbons while insufficient for removing substantial proportions of sulfur bodies thereby increasing the sulfur content of the feed on recycle and then regenerating the carbon bed in a second stage by heating the bed to a temperature of about 300° C. for removal of the sulfur bodies from the carbon bed, the temperature being insufficient for effecting destruction of the carbon itself.

Figure 1:
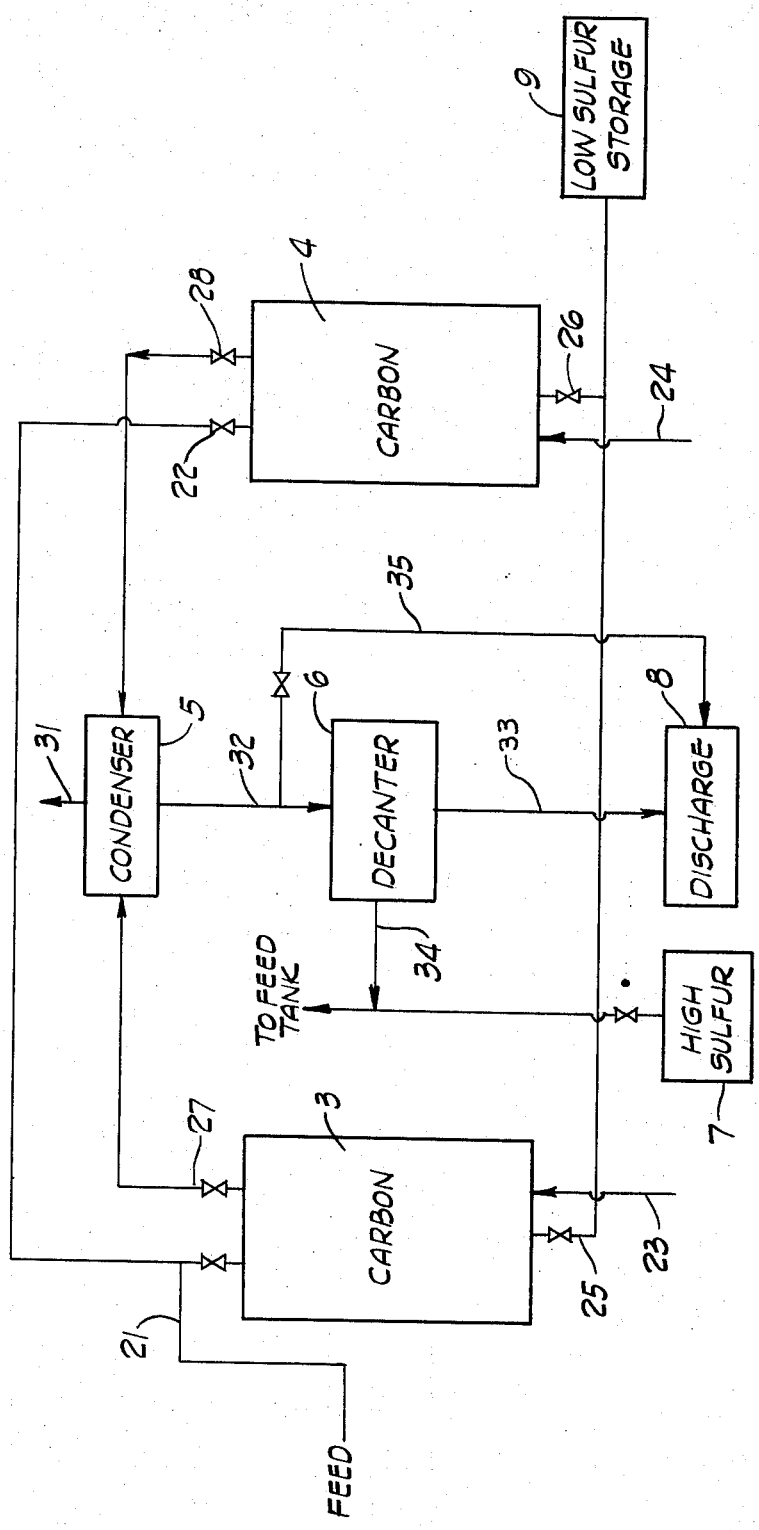
FIG. 1 is a flow diagram of a process for removing sulfur from $\alpha$-pinene-rich turpentine fraction.

A turpentine hydrocarbon fraction laden with sulfur bodies useful for practicing this invention is one that should have a sulfur content below above 500 parts per million (p.p.m.) and preferably below about 100 p.p.m. When the sulfur content is substantially higher; e.g., up to 1000 p.p.m., reduced life expectancy of carbon beds are noted. Moreover, efficiency for the removal of sulfur bodies from the feed often appears reduced in that it is difficult to reduce the sulfur content to below about 1 to 2 p.p.m. sulfur. Another important feature of the feed stock to be used in practicing the invention is that it should be relatively free (contain less than about 5% and preferably less than 0.2% by weight) of turpentine hydrocarbons having conjugated unsaturation. These types of hydrocarbons tend to be adsorbed by the carbon bed affecting the ability of the carbon to remove sulfur thereby shortening the bed life thereof. Further, there often is attendant loss of the hydrocarbon fraction due to an inability to recover all of the hydrocarbon from the carbon bed. Turpentine hydrocarbons having conjugated unsaturation which should not be present in the feed in an amount exceeding 5% by weight include: myrcene, ocimene, allocimene, $\alpha$-phellandrene, $\beta$-phellandrene, 3,8-para-menthadiene, $\alpha$-terpinene, isoterpinolene, and para-cymene.

Turpentine hydrocarbon feed for treatment then can contain a plurality of hydrocarbons such as which can be present with $\alpha$-pinene in the feed stock include the hydrocarbons having isomerization feed stocks such as limonene, carene, $\beta$-pinene, and so forth. On the other hand, it should be relatively free of hydrocarbon compounds having a boiling point of about 150° C. or lower than $\alpha$-pinene at atmospheric pressure. Although a small proportion of such components can be tolerated, it is preferred that they not exceed about 15% by weight of the feed. Thus, those hydrocarbon compounds which can be included in the feed stock with $\alpha$-pinene are those having a boiling point higher than α-pinene. These would include β-pinene, camphene, carene, dipentene, and others.

A preferred feed stock for my invention is one described in an application having Ser. No. (1970 series) 76,003 and a filing date of Sept. 28, 1970 (now U.S. Pat. 3,655,803). These feeds are prepared by distilling crude sulfate turpentine and contain usually from about 50 to 150 p.p.m. sulfur content and are rich in α-pinene; that is, they contain more than 50% α-pinene and preferably above 75%.

Virtually any activated carbon can be used for sorbing the sulfur compounds from the turpentine hydrocarbon fraction and there is substantial literature available on activated carbon systems capable of removing sulfur compounds from hydrocarbons. Some, however, are better than others and this information is given in product literature sheets. One particular activated carbon which has been found desirable for use herein is Pittsburgh's activated carbon BPL having a particle size of 12 to 30 mesh. The carbon sorbers are filled with activated carbon and loosely packed to a density of about 20 to 30 pounds per cubic foot and preferably a packing density of about 25 pounds per cubic foot. When using this particular carbon at that packing density, one can predict that about 10 bed weights of turpentine hydrocarbon feed stock having the sulfur content as described, can be treated prior to requiring regeneration. By bed weights of feed stock treated, it is meant to refer to the weight of the feed stock treated by the weight of carbon in the sorber. In other words, assuming 100 lbs. carbon are used as the carbon bed in the sorber, then 1000 lbs. feed treated corresponds to 10 bed weights treated.

FIG. 1 represents a flow diagram for a preferred process in removing sulfur compounds from a turpentine feed stock rich in α-pinene. The feed stock has a sulfur content of 100 p.p.m., an α-pinene content of about 95%, and contains not more than 0.2% by weight of conjugated terpenes. Carbon sorbers 3 and 4 are 35 to 40 ft. in length and 4 ft. in diameter and can provide for continuous processing of the feed stock. To utilize these sorbers for continuous processing, only one sorber is in service at a time while the other is either being regenerated or filled with activated carbon.

Liquid-phase feed stock rich in α-pinene is introduced to carbon sorber 3 through line 21. It is introduced to the sorber at a rate of about 0.5 to 1.5 gallons per minute per square foot of sorber and at a temperature of about 70° F. to 100° F. This flow rate provides a residence time in the sorber sufficient to remove substantially all of the sulfur compounds in the turpentine fraction so that the exit fraction drawn off through line 25 contains not substantially more than 5 p.p.m. sulfur and preferably 0 p.p.m. sulfur. In carbon sorbers 3 and 4, a residence time of about 15 to 30 minutes is required to reduce the sulfur content of the feed stock from 150 p.p.m. to 0 p.p.m. However, the flow rate and resultant residence times can be varied as desired to compensate for desired sulfur removal. The temperature for the contacting step and removing sulfur compounds from the turpentine fraction generally is about 70° to 100° F. and the pressure is atmospheric. When the sulfur content in exit line 25 exceeds about 5 p.p.m., the carbon sorber is shut down and the feed switched to pass into carbon sorber 4 through line 22. Identical flow rates are used in carbon sorber 4 to maintain low sulfur content α-pinene in exit line 26 from that sorber.

After the contacting step in the carbon sorber is completed, and the carbon in the sorber is spent, it must be regenerated for additional usage. By employing the processing regenerative steps described herein, it has been found that there is little loss of turpentine feed stock due to adsorption on the activated carbon during the contacting stage and yet 20 regeneration cycles often can be completed without substantial loss in the viability of the activated carbon in terms of its ability to remove sulfur from the turpentine feed stock. Accordingly, an aspect of this invention is in the regenerative process and it comprises essentially two steps: the first regenerative step comprises passing an inert gas into carbon sorber 3 through line 23, for removal of adsorbed turpentine. The inert gas generally is steam, although carbon dioxide, nitrogen, and helium, as well as other inert gases can be used. Air is generally avoided as it may cause oxidation of the adsorbed turpentine hydrocarbon. The steam is introduced through the gas inlet line 23 at a temperature of about 110° C. to about 150° C. to effect removal of the adsorbed turpentine hydrocarbons. Althought the temperature can be increased to about 150° C. or above, it is preferred to utilize lower temperatures as there is a tendency to remove substantial proportions of sulfur compounds simultaneously with the removal of adsorbed hydrocarbons. The first regenerative step is continued until the adsorbed hydrocarbon steam fraction has a sulfur content of about 50 to 75 p.p.m. sulfur. The stripped hydrocarbons having a sulfur content much above this level cannot be used for making up low sulfur product and is undesirable for recycling to the feed stream. Of course, if the sulfur content in the stripped fraction would exceed in p.p.m. that of the feed stock, it would increase the sulfur content in the feed which would not be desirable.

The second regenerative step is conducted after completion of the first regenerative step for the purpose of regenerating the carbon in the sorber unit to activate it to about 100% of its original capacity for adsorbing sulfur compounds. Super-heated steam is passed through gas inlet line 23 at a temperature of about 250 to 350° C. for regeneration of the carbon bed while simultaneously removing the sulfur compounds adsorbed by the carbon. The gaseous steam then is withdrawn through exit line 27 of carbon sorber 3. Higher temperatures up to about 1800° F. can be utilized for regenerating carbon. However, in plant operations these temperatures are very difficult and often impossible to obtain as these temperatures generally are obtained only by means of a furnace. The regeneration temperature is limited to the extent that it removes sulfur compounds adsorbed on the carbon and does not damage the carbon or its ability to adsorb sulfur compounds.

With reference to the removal of adsorbed turpentine hydrocarbon, in the first regenerative step the gas is withdrawn through exit line 27 and passed to a water quench or condenser 5 where it is condensed. There, the turpentine hydrocarbon fraction and steam form a liquid phase. Any volatile material is withdrawn from the condenser through line 31 and vented to the air. The condensate in the condenser is discharged through line 32 to a decanter 6 to allow formation of a distinct water and oil phase, the oil containing relatively low sulfur turpentine hydrocarbon fraction. This oil fraction is withdrawn from the decanter through line 34 and recycled to the feed tank (not shown) of turpentine hydrocarbon feed stock, thereby minimizing losses of hydrocarbons in the processing. The water is withdrawn through line 33 of decanter 6 and sent to discharge 8.

With regard to the second regenerative step, the steam is passed into line 23 and the sulfur removed from the carbon by the steam and removed through line 27. The gas then is sent to the condenser and the product sent to discharge through line 35.

In continuous operation, only one sorber, either 3 or 4 is used at a time. However, common lines are noted for both sorbers and the process is essentially the same. Feed stock passes through line 22 to sorber 4 and product withdrawn through line 26 and sent to low sulfur storage. The regenerative steps are the same as with sorber 3. In regenerating the carbon steam is introduced into line 24 and exit gas withdrawn through line 25 and sent to condenser 5.

It is, of course, within the skill of those in the art that sorbers 3 and 4 can be combined to operate in series for removal of sulfur or for that matter, a plurality of sorbers similar to sorbers 3 and 4 can be set up to operate in series or parallel for the sulfur removal of sulfur in turpentine hydrocarbon feed stocks. Sometimes a series arrangement is advantageous in that smaller units can be utilized thereby minimizing the cost for fabrication of equipment and space used for housing the sorbers. In a series arrangement, the exit fraction from a carbon sorber becomes the feed stock to the next sorber in line, and so on.

Although flow lines have been drawn in, it is to be understood that feed lines can come into the sorber at the top or side and flow can be in any direction. Moreover, steam can be passed into the top or side of the sorber for effecting regeneration. Exit gas can be withdrawn at any point, but usually opposite that of the steam inlet.

Figure 2:
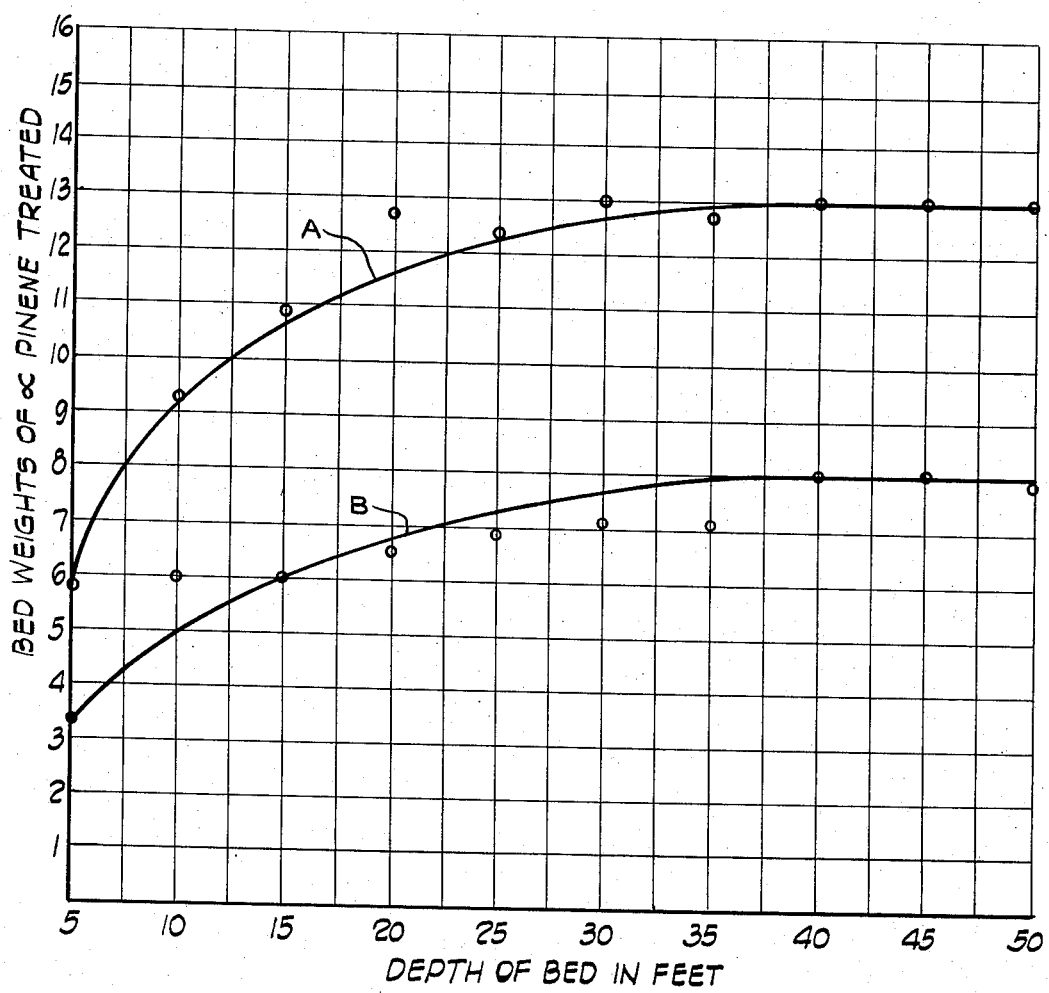
FIG. 2 is a plot of the bed weights of feed stock treated by weight of carbon as a function of the bed length of the sorber.

FIG. 2 represents a graph of the number of bed weights of α-pinene feed stock treated as a function of the length of the carbon bed in the sorber. The flow rate was about 0.85 gallons per minute per square ft. cross-sectional area. The graph shows bed lengths of 20 to 40 ft. are desirable. In FIG. 2 curve A represents product effluent having 5 parts per million sulfur or less. Curve B represents a product effluent having 1 part per million sulfur or less. The feed employed in establishing curves A and B had a sulfur content of about 100 parts per million.

Materials of construction for the carbon-sorber decanter condenser can be any of the materials used for chemical processing equipment and examples of such materials are given in Chemical Engineering Handbooks such as the one by Perry, published by McGraw-Hill. Materials of construction are carbon steel, stainless steel, mild steel, cast iron, or lined vessels, such as glass-lined or reinous-lined processing equipment. Preferably for reasons of efficiency and economy, carbon steel is the material of construction employed for making the condenser decanter and carbon sorbers as the feed stock treated in this process is relatively non-corrosive.

What is claimed is:

1. In a multi-stage activated carbon sorption process for desulfurizing a turpentine hydrocarbon fraction wherein said fraction is contacted with said carbon in a first stage until said carbon is laden to a predetermined level sorbed with sulfur compounds and then that sorption stage regenerated, the improvement which comprises: (a) feeding to said primary stage, a turpentine fraction stripped substantially of light ends boiling below α-pinene, said turpentine hydrocarbon fraction having not substantially more than 500 parts per million (p.p.m.) sulfur therein; and (b) regenerating the resulting sulfur-laden carbon in a plurality of steps, the first regenerating step at a temperature and for a time sufficient for removing sorbed turpentine hydrocarbon for recycle to step 1 without substantially increasing the overall sulfur content of the feed stream, and the second regenerated step at a temperature higher than said first step for finishing the regeneration of said carbon.

2. The process of claim 1 wherein said first regenerative step is conducted at a temperature not substantially above 150° C. and continued until the sulfur content in the stripped phase is not substantially above 50 p.p.m. sulfur.

3. The process of claim 2 wherein said second regenerative step is conducted at a temperature between about 250° and 300° C. and continued for a time sufficient to effect removal of substantially all of the sulfur in said carbon.

4. The process of claim 3 wherein said feed stock has not substantially more than about 2 p.p.m. sulfur after contact with said carbon in said primary stage.

References Cited
UNITED STATES PATENTS

| | | | |
|---|---|---|---|
| 2,459,570 | 1/1949 | McGregor | 162—15 |
| 2,630,403 | 3/1953 | Miller | 208—310 |
| 3,346,484 | 10/1967 | Lewis | 208—237 |

DELBERT E. GANTZ, Primary Examiner

G. E. SCHMITKONS, Assistant Examiner

U.S. Cl. X.R.

208—208 R, 250, 305

UNITED STATES PATENT OFFICE
CERTIFICATE OF CORRECTION

Patent No. 3,778,486　　　　　　　　Dated December 11, 1973

Inventor(s) Clayton B. Hamby, Jr.

It is certified that error appears in the above-identified patent and that said Letters Patent are hereby corrected as shown below:

Column 2, line 37, delete "above" and insert therefor --about--.

Column 4, line 12, delete "Althought" and insert therefor --Although--.

Signed and sealed this 21st day of May 1974.

(SEAL)
Attest:

EDWARD M. FLETCHER, JR.　　　　　　C. MARSHALL DANN
Attesting Officer　　　　　　　　　Commissioner of Patents